United States Patent [19]
Yamazaki et al.

[11] Patent Number: 5,820,148
[45] Date of Patent: Oct. 13, 1998

[54] WORK VEHICLE

[75] Inventors: Nobuo Yamazaki; Masayuki Sasaoka, both of Wako, Japan

[73] Assignee: Honda Giken Kogyo Kabushiki Kaisha, Japan

[21] Appl. No.: 688,474

[22] Filed: Jul. 30, 1996

[30] Foreign Application Priority Data

Oct. 23, 1995 [JP] Japan .................................. 7-274601

[51] Int. Cl.$^6$ .................................................. B60G 17/00
[52] U.S. Cl. ............................................................ 280/124.1
[58] Field of Search ................................... 280/673, 675; 172/900

[56] References Cited

U.S. PATENT DOCUMENTS

| | | | |
|---|---|---|---|
| 2,689,510 | 9/1954 | Petermann | 172/900 |
| 2,775,926 | 1/1957 | Blackstock | 172/900 |
| 4,236,728 | 12/1980 | Policy et al. | 280/661 |
| 4,957,308 | 9/1990 | Takizawa | 280/675 |
| 4,973,076 | 11/1990 | Fayard | 280/675 |
| 5,026,091 | 6/1991 | Lee | 280/675 |
| 5,246,245 | 9/1993 | Sato et al. | 280/675 |
| 5,405,162 | 4/1995 | Chun | 280/675 |
| 5,474,315 | 12/1995 | Klas et al. | 280/112.1 |
| 5,495,905 | 3/1996 | Fini, Jr. | 280/720 |

FOREIGN PATENT DOCUMENTS 53-52743  12/1978  Japan .

*Primary Examiner*—Charles Jordan
*Assistant Examiner*—Theresa M. Wesson
*Attorney, Agent, or Firm*—Adams & Wilks

[57] ABSTRACT

A work vehicle has steered wheels positioned forwardly of the vehicle relative to the direction of run of the vehicle, the steered front wheels having a caster angle of minus value ranging from −0.5° to −2°. Preferably, the caster angle is set at −1°. As a result, it becomes possible to reduce a steering torque, especially a peak steering torque, and to obviate infiltrating and overshooting feels, thus providing a comfortable steering feel with respect to the vehicle.

6 Claims, 6 Drawing Sheets

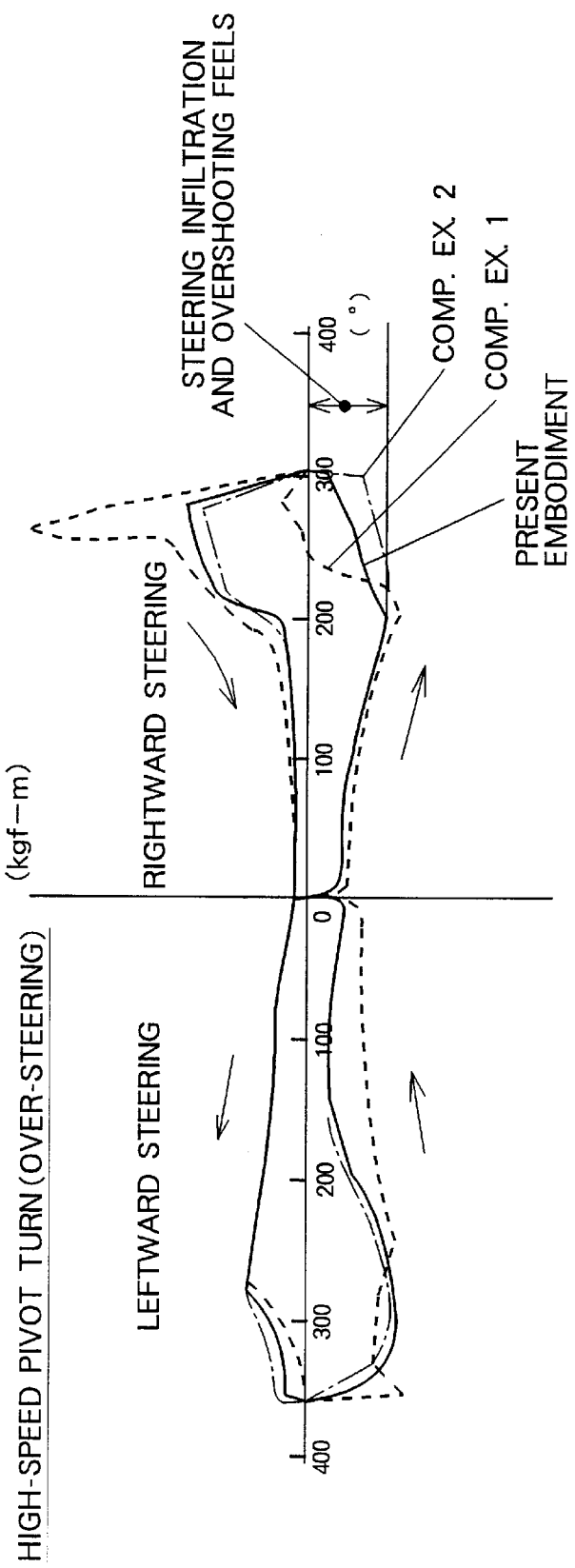

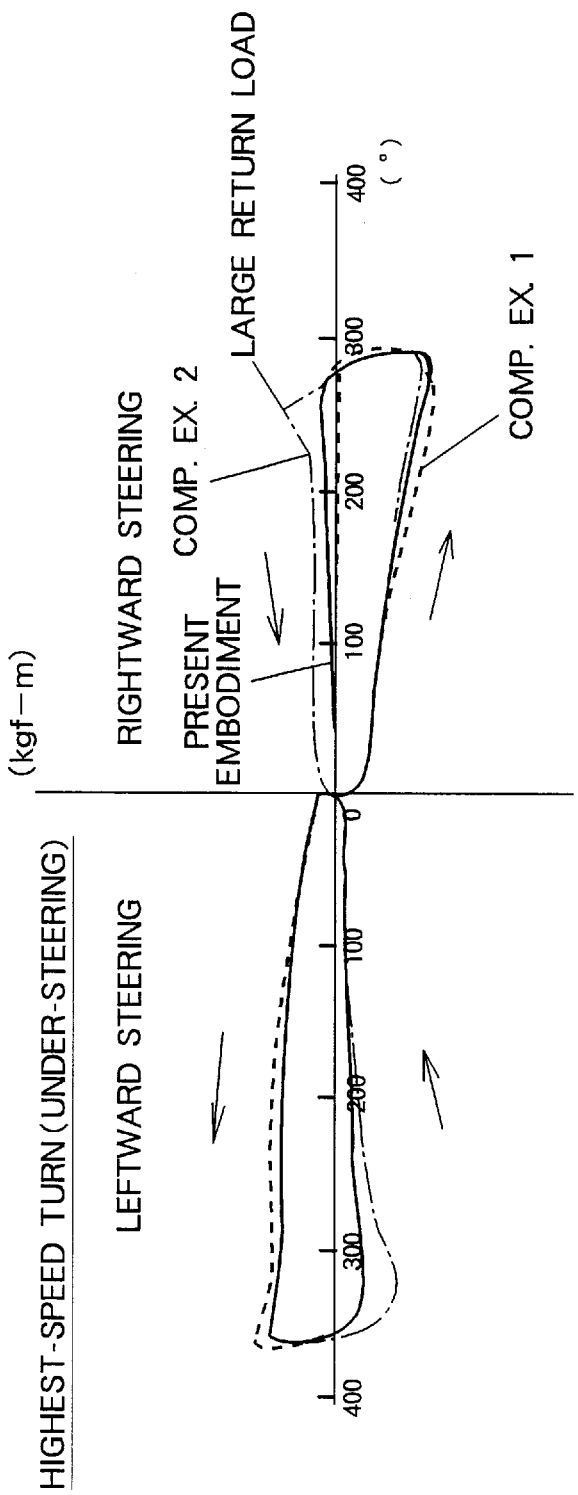

WORK VEHICLE

BACKGROUND OF THE INVENTION

1. Field of the Invention

The present invention relates to an improvement in a work vehicle such as a tractor with a work machine attached thereto and more particularly to a work vehicle designed to require a reduced steering force and to provide a more comfortable steering feel.

2. Description of the Related Art

Generally, work vehicles such as a tractor equipped with right and left front wheels and right and left rear wheels are steered through the front wheels and driven through the rear wheels. Many work vehicles of such kind employ the technique of wheel alignment and hence their front wheels are arranged to have a plus caster angle.

Two example vehicles of such kind are disclosed in Japanese Utility Model Publication No. SHO 53-52743. One disclosed vehicle has front and rear wheels with a plus caster angle while the other disclosed vehicle has front wheels with a plus caster angle and rear wheels with a minus caster angle.

It has been known that direct or linear mobility is improved if front wheels are arranged to have a plus caster angle. However, if front wheels of a work vehicle such as a tractor are provided with a plus caster angle, the vehicle encounters inconveniences upon making a pivot turn, that is, a turn with a rear internal wheel locked, such that a large moment is produced in the steered wheels positioned forwardly of the vehicle relative to the direction of run of the vehicle, whereby a large steering force is required, thus worsening steerage of a steering wheel of the vehicle.

Moreover, unlike passenger cars, a work vehicle such as a tractor is often required to run over an undulating plowland including ridges and recesses, in which instance an increased steering force is required of the vehicle.

SUMMARY OF THE INVENTION

It is therefore an object of the present invention to provide a work vehicle requiring a reduced steering force and capable of producing a comfortable steering feel.

According to the present invention, there is provided a work vehicle including steered wheels positioned forwardly of the vehicle relative to the direction of run of the vehicle, the front wheels being arranged to have a minus caster angle. With this arrangement, it becomes possible to reduce a steering force, especially a peak steering force, and to obviate an infiltrating feel and an overshooting feel, thus providing a comfortable steering feel.

Preferably, the caster angle is within the range of −0.5° to −2°. By setting the caster angle at −2° or lower, it becomes possible to reduce a steering force while maintaining the desired linear mobility. Particularly, a caster angle of −1° is most appropriate.

BRIEF DESCRIPTION OF THE DRAWINGS

A preferred embodiment of the present invention will hereinafter be described in greater detail with reference to the accompanying drawings, in which:

FIG. 5 is a graph showing a steering torque to be produced upon a pivot turn of the work vehicle at a high speed; and FIG. 6 is a graph showing a steering torque to be produced upon turning of the work vehicle at a highest speed.

DETAILED DESCRIPTION OF THE PREFERRED EMBODIMENT

Figure 1:
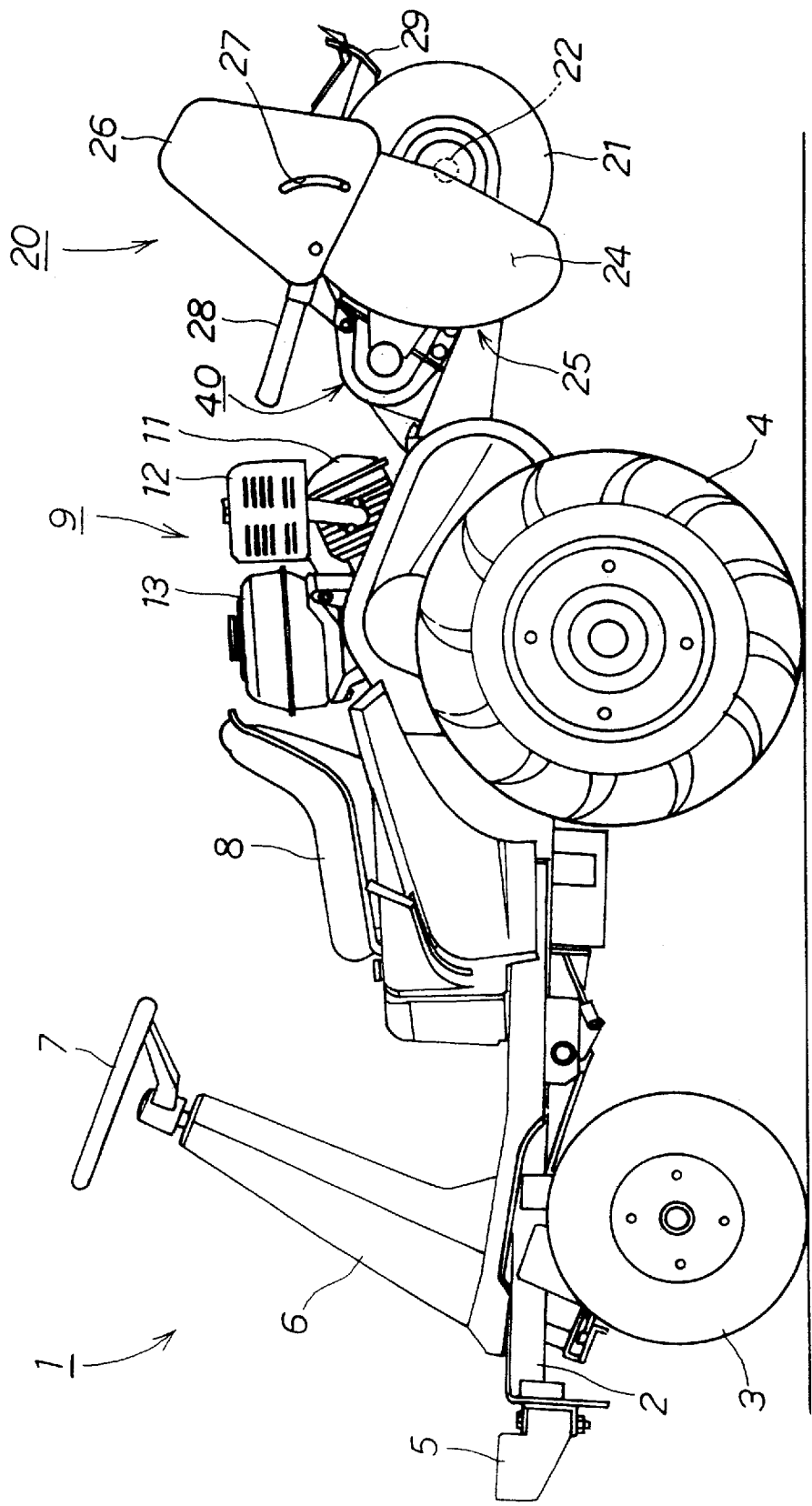
FIG. 1 is a side elevational view of a work vehicle according to the present invention.

With initial reference to FIG. 1, a relatively small, light-weighted work vehicle 1 includes a vehicle body frame 2 having front wheels 3 (only one shown) of reduced diameter and rear wheels 4 (only one shown) of increased diameter respectively disposed at a front portion and a rear portion of the body frame 2. From the fore side to the rear side, the vehicle 1 also includes front weights 5 (only one shown) provided at a front end of the frame, a steering post 6, a steering wheel 7, a driver seat 8, and an engine 9 (having a cylinder head 11, a muffler 12 and a fuel tank 13 disposed at an upper part of the vehicle body). The work vehicle 1 further carries at a rear portion thereof a work machine 20 such as a rotary tiller 20 releasably suspended therefrom.

The rotary tiller 20, shown in FIG. 1 as being ascended by a hydraulic cylinder (not shown), has a tiller pawl member 21 which is driven for normal and reverse rotation by a driving force supplied from the engine 9 through a transmission system. In the embodiment being described, the tiller pawl member 21 is disposed coaxially with a tiller shaft 22 and is comprised of a plurality of normal rotation pawls and a plurality of reversal rotation pawls.

Designated by reference numeral 40 is a tiller transmission for transmitting a driving force of the engine 9 to the tiller shaft 22 at a reduced rate. Designated by reference numeral 24 is a rotary side cover for covering both sides of a rotary cover 25 which in turn covers an upper half of the tiller pawl member 21. A position-adjustable side rear cover 26 is disposed rearwardly of the rotary cover 25 and has a curved slit for that reason. Reference numeral 28 designates a resistive rod having at a top (lower) end thereof a tail sledge or a depth adjusting shoe 29 for adjusting the depth of plow.

Figure 2:
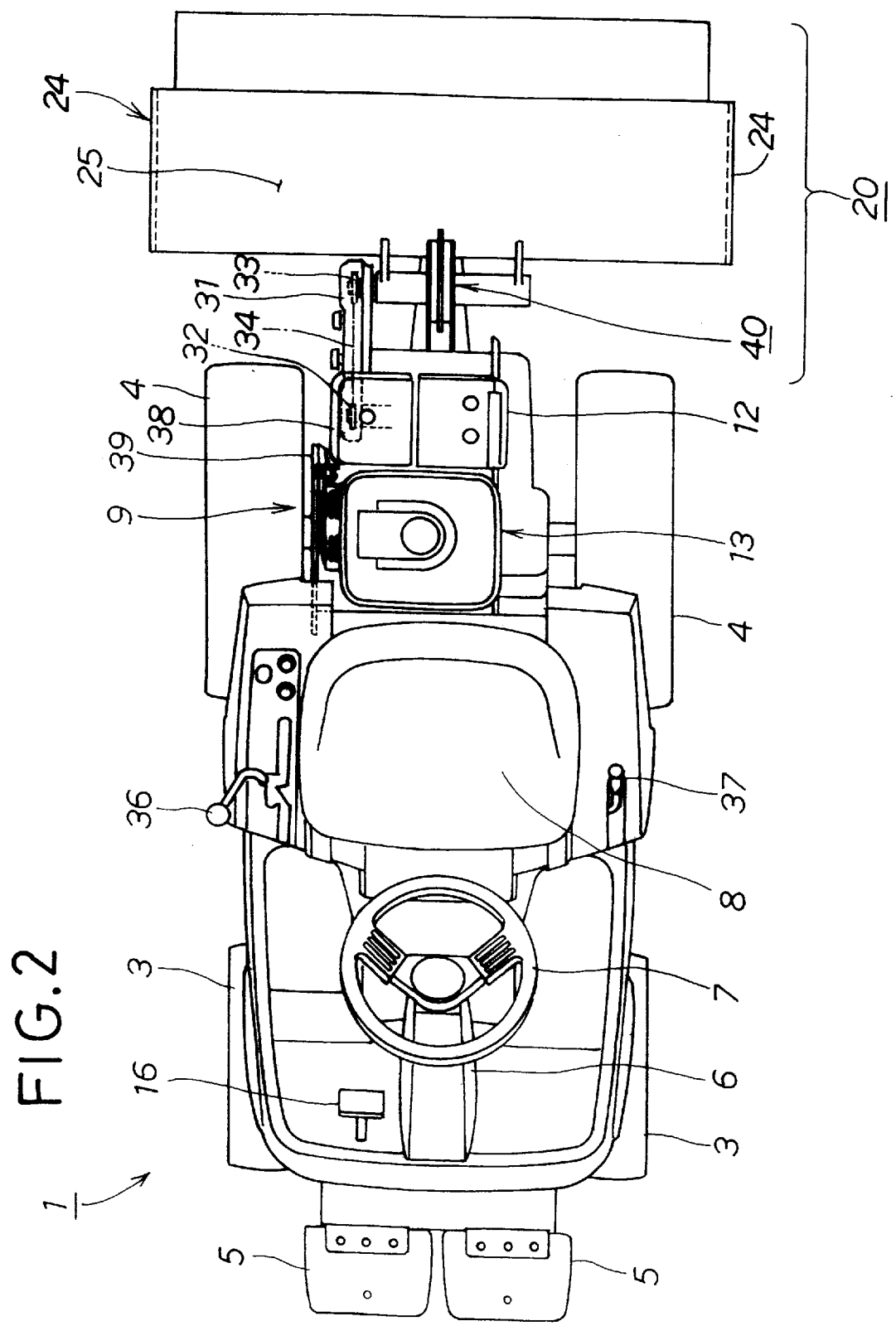
FIG. 2 is a top plan view of the work vehicle with a schematically-depicted rotary tiller as a work machine connected thereto.

Reference is now had to FIG. 2 in which the work vehicle of FIG. 1 is shown as seen from above (the rotary tiller 20 being shown schematically). Other than the front weights 5, steering wheel 7, driver seat 8, engine 9, tiller transmission 40 and rotary tiller 20, the vehicle 1 includes an operation pedal 16 and a chain case 31 as part of the transmission system.

The chain case 31 accommodates a drive sprocket 32, a driven sprocket 33 and a chain 34 in a sealed fashion. Similarly, the tiller transmission 40 accommodates several gears not shown, a sprocket and a chain in a sealed fashion. Thus, there is no concern of rain and dirt coming inside the transmission 40.

Reference numeral 36 designates a shift or speed changing lever. Designated by reference numeral 37 is a lever for starting and stopping rotational movement of the tiller pawl member. Reference numerals 38 and 39 designate an air cleaner and a starter grip, respectively.

Figure 3:
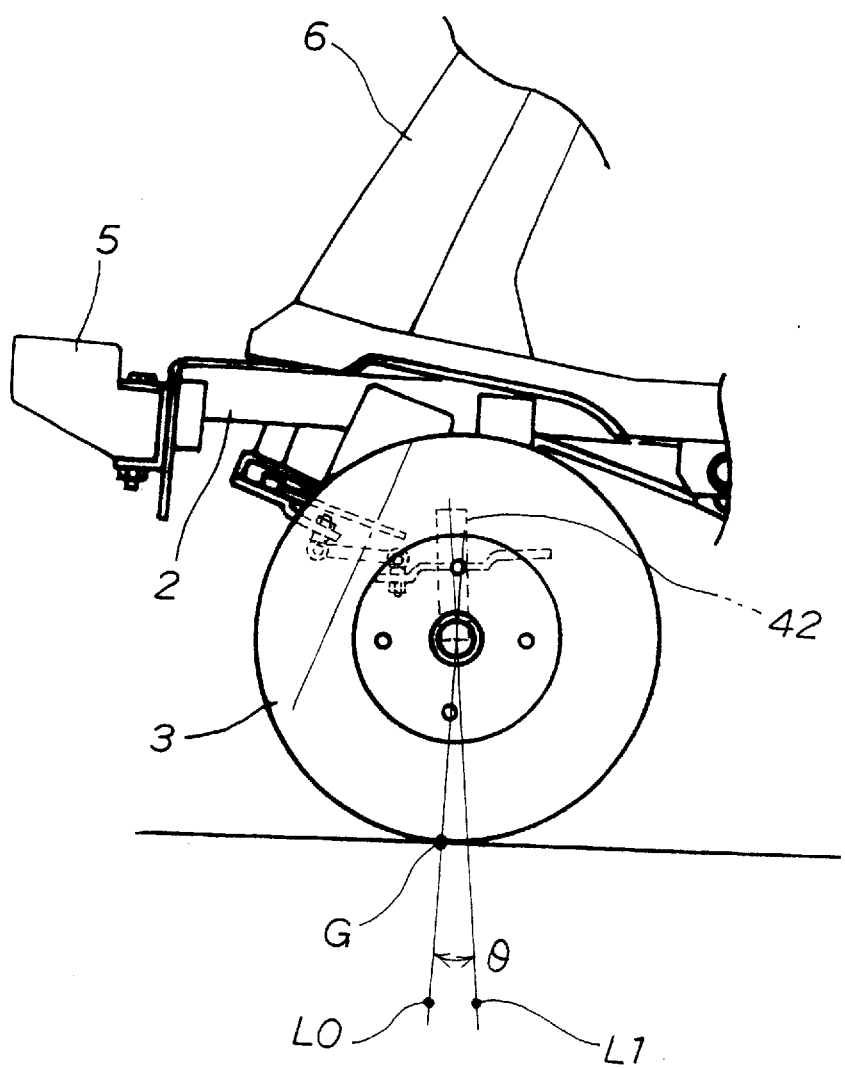
FIG. 3 is an enlarged schematic view of a front wheel of the work vehicle.

Reference is now had to FIG. 3 in which one of the front wheels of the work vehicle of FIG. 1 is shown on an enlarged scale. A vertical line L0 passing an axis of the front wheel 3 intersects with an axial line L1 passing a king-pin 42 to provide a caster angle θ therebetween. The caster angle θ is located backwardly of a ground contact point G and hence is on the minus side within the range of −0.5° to −2°, preferably set at −1.0°.

Operation of the work vehicle thus arranged according to the present invention will hereinafter be described with reference to FIG. 4 to FIG. 6. In these figures, a transverse axis represents a steering angle while a vertical axis represents a steering torque. A solid line corresponds to the present invention with the caster angle of −1°. A dotted line corresponds to comparative example 1 with the caster angle of +2°. A single-dotted line corresponds to comparative example 2 with the caster angle of −3°.

Figure 4:
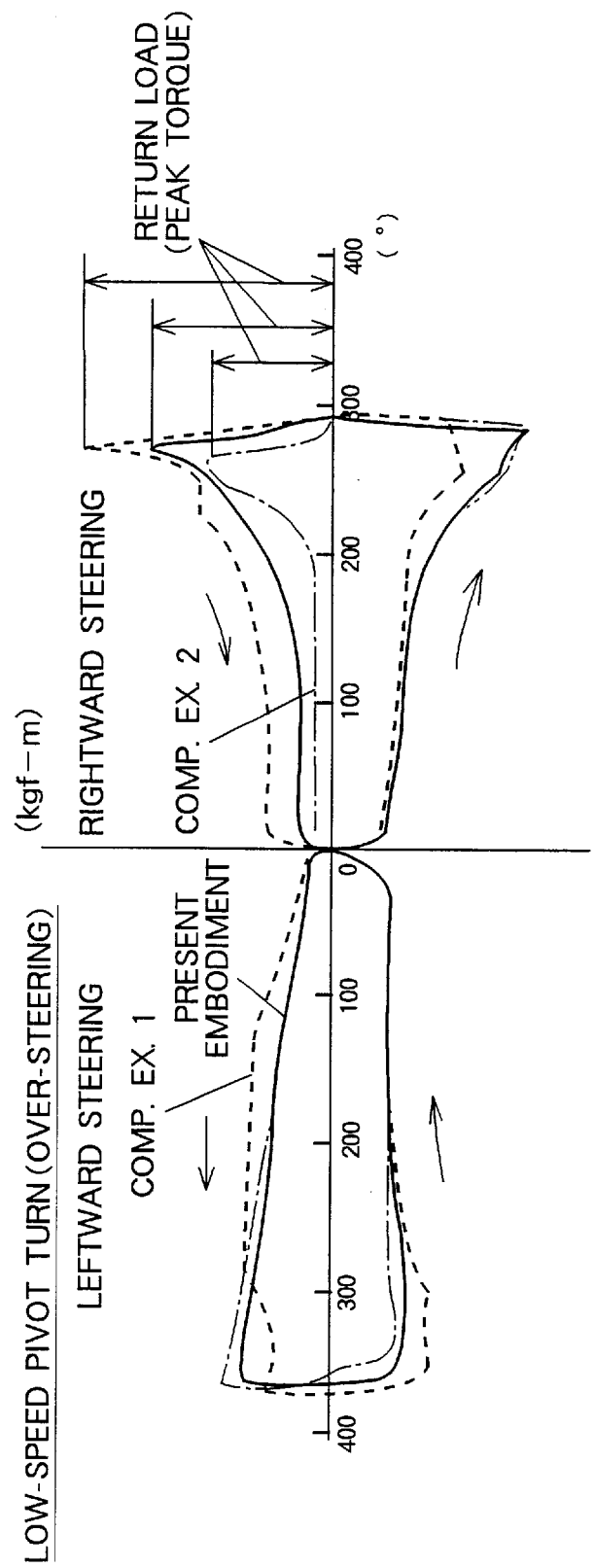
FIG. 4 is a graph showing a steering torque to be produced upon a pivot turn of the work vehicle at a low speed.

FIG. 4 is a graph showing a steering torque to be produced upon a low-speed pivot turn of the work vehicle according to the present invention. As seen from an upper right part of the graph, a peak (torque) is generated in a respective return or backward load (torque) to arise when steering is performed to a rightmost position and then reversed to a leftward position, the magnitude of which peaks is comparative example 2<present embodiment<comparative example 1. The farther the caster angles go on a minus scale, the smaller the peak (torque) values of the return loads become.

Shown in FIG. 5 is a graph of a steering torque to be produced upon a high-speed pivot turn of the work vehicle according to the present invention. As seen from a lower right part of the graph, comparative example 1 exhibits an S-shaped curve corresponding to infiltrating and overshooting feels and hence is unacceptable. The term "infiltrating feel" used herein is meant to be a feeling felt by a driver when inward steering is accelerated by generation in a steering system of a torque larger than a steering force exerted to the steering system by the driver. Also, the term "overshooting feel" used herein is meant to be a feeling felt by a driver from a steering wheel upon passing over a peak torque encountered during a steering operation. Comparative example 2 is far better than comparative example 1 but inferior to the present embodiment.

FIG. 6 is a graph showing a steering torque to be generated upon a highest-speed turn (Under Steering) of the work vehicle according to the present invention. As seen from an upper right part of the graph, peak value generation and return load increase occur only in comparative example 2. No problems are perceived in the present embodiment and comparative example 1. Since this is the return load increase generated upon a highest-speed turn, an adverse effect associated therewith should not be ignored.

Evaluations of the graphs of FIG. 4 to FIG. 6 are summarized in Table 1 below.

Comparative example 2 (caster angle=−3°) received partial evaluations of ○, Δ, X, and hence its general evaluation is X.

In making the general evaluations, a standard was applied such that one or more Xs make the general evaluation X.

As it can be appreciated from the foregoing, a caster angle of −1° is most appropriate, though experiments carried out by the present inventors indicate that generally equivalent results can be obtained if the caster angle is set to be within the range of −0.5° to −2°. If the caster angle is set to be less than −0.5° (closer to 0°), little merits result. Contrarily, the caster angle set to be larger than −2° (closer to −3°) causes a swinging or rattling steering feel to become significant and hence is undesirable.

In connection with the present embodiment, the work vehicle has been described as towing a tiller as a work machine, this was given merely for illustration and should not be construed as being limited thereto. The work machine may also be attached to the fore side of the work vehicle.

Obviously, various minor changes and modifications of the present invention are possible in the light of the above teaching. It is therefore to be understood that within the scope of the appended claims, the invention may be practiced otherwise than as specifically described.

What is claimed is:

1. A work vehicle adapted to be connected to a work machine during use of the work vehicle, comprising: a pair of steered wheels positioned forwardly of the work vehicle relative to a direction of run of the work vehicle, the steered wheels having a minus caster angle in the range of −0.5° to −2°.

2. A work vehicle adapted to be connected to a work machine during use of the work vehicle, comprising: a pair of steered wheels positioned forwardly of the work vehicle relative to a direction of run of the work vehicle, the steered wheels having a minus caster angle of −1°.

3. A work vehicle, comprising: a frame having one end positioned forwardly of the work vehicle relative to a direction of run of the work vehicle; and at least one steerable wheel mounted at the one end of the frame, the steerable wheel having a negative caster angle in the range of −0.5° to −2°.

4. A work vehicle as claimed in claim 3; further comprising means for steering the steerable wheel during travel of the work vehicle in the direction of run.

TABLE 1

|  | caster angle | lines | low-speed pivot turn | high-speed pivot turn | highest-speed pivot turn | general evaluation |
|---|---|---|---|---|---|---|
| present embodiment | −1° | — | Δ | ⊙ | ○ | ⊙ |
| comparative example 1 | °2° | — | x | x | ○ | x |
| comparative | −3° | — | ○ | Δ | x | x |

The present embodiment (caster angle=−1°) received partial evaluations of Δ (acceptable), ⊙ (good), ○, and hence its general evaluation is ⊙.

Comparative example 1 (caster angle=+2°) received partial evaluations of X (unacceptable), X, ○, and hence its general evaluation is X.

5. A work vehicle as claimed in claim 4; wherein the caster angle is −1°.

6. A work vehicle as claimed in claim 3; wherein the caster angle is −1°.

* * * * *